United States Patent [19]

Heitmann et al.

[11] Patent Number: 5,291,514
[45] Date of Patent: Mar. 1, 1994

[54] HEATER AUTOTONE CONTROL APPARATUS AND METHOD

[75] Inventors: Walter Heitmann; David Waters, both of Hopewell Junction, N.Y.

[73] Assignee: International Business Machines Corporation, Armonk, N.Y.

[21] Appl. No.: 731,112

[22] Filed: Jul. 15, 1991

[51] Int. Cl.⁵ .............................. H05B 3/64
[52] U.S. Cl. ..................... 373/135; 219/485; 219/497; 219/390; 392/416; 364/477
[58] Field of Search .............. 373/135; 219/405, 411, 219/485, 486, 483, 497, 480, 390; 392/416, 418; 118/724, 725, 50.1; 364/557, 477

[56] References Cited

U.S. PATENT DOCUMENTS

| | | |
|---|---|---|
| 3,584,291 | 6/1971 | Budmaik et al. ............ 219/494 |
| 4,348,580 | 9/1982 | Drexel . |
| 4,416,623 | 11/1983 | Takahashi . |
| 4,542,283 | 9/1985 | Leverenz ............ 219/483 |
| 4,554,437 | 11/1985 | Wagner . |
| 4,556,784 | 12/1985 | Nakai ............ 219/425 |
| 4,565,917 | 1/1986 | Furtek . |
| 4,654,502 | 3/1987 | Furtek . |
| 4,657,507 | 4/1987 | Kohama et al. . |
| 4,688,180 | 8/1987 | Motomiya . |
| 4,711,989 | 12/1987 | Yu . |
| 4,782,445 | 11/1988 | Pasquini ............ 219/494 |
| 4,817,009 | 3/1989 | Jensen et al. ............ 364/557 |
| 4,833,301 | 5/1989 | Furtek . |
| 4,886,954 | 12/1989 | Yu et al. . |
| 4,926,364 | 5/1990 | Brotherton ............ 364/581 |
| 4,952,780 | 8/1990 | Curreri et al. . |
| 5,003,160 | 3/1991 | Matsuo et al. ............ 219/494 |
| 5,023,431 | 6/1991 | Roberge ............ 219/494 |
| 5,053,604 | 10/1991 | Escaravage et al. ............ 219/483 |

FOREIGN PATENT DOCUMENTS 61-199016 3/1986 Japan .
63-149319 2/1988 Japan .
1421786 7/1976 U.S.S.R. .

OTHER PUBLICATIONS

"Control System Principles and Design"; Ernest O. Doebelin; Dept. of Mechanical Engineering; Ohio State University; pp. 422–436.

"Control Systems–Analysis, Design, and Simulation" John W. Brewer; Department of Mechanical Engineering; University of California, Davis; pp. 199–202.

Primary Examiner—Bruce A. Reynolds
Assistant Examiner—John A. Jeffrey
Attorney, Agent, or Firm—Whitham & Marhoefer

[57] ABSTRACT

A method and apparatus for automatically and dynamically tuning individual heater segments of a multi-zone furnace which allows simultaneous minimization of temperature gradients within the furnace and prevention of premature aging and failure of the segments by controlling the relative temperatures thereof and equalization of the contributions of the segments to the heating of the furnace. Furnace and heater temperatures are monitored and furnace temperatures are used to develop set point biases for automatic control of heater segment temperatures. Some segments are also controlled as a function of power applied to other segments. Temperatures sensed within the furnace are combined such as by averaging to effectively provide virtual sensors in locations where sensors cannot otherwise be practically provided.

16 Claims, 7 Drawing Sheets

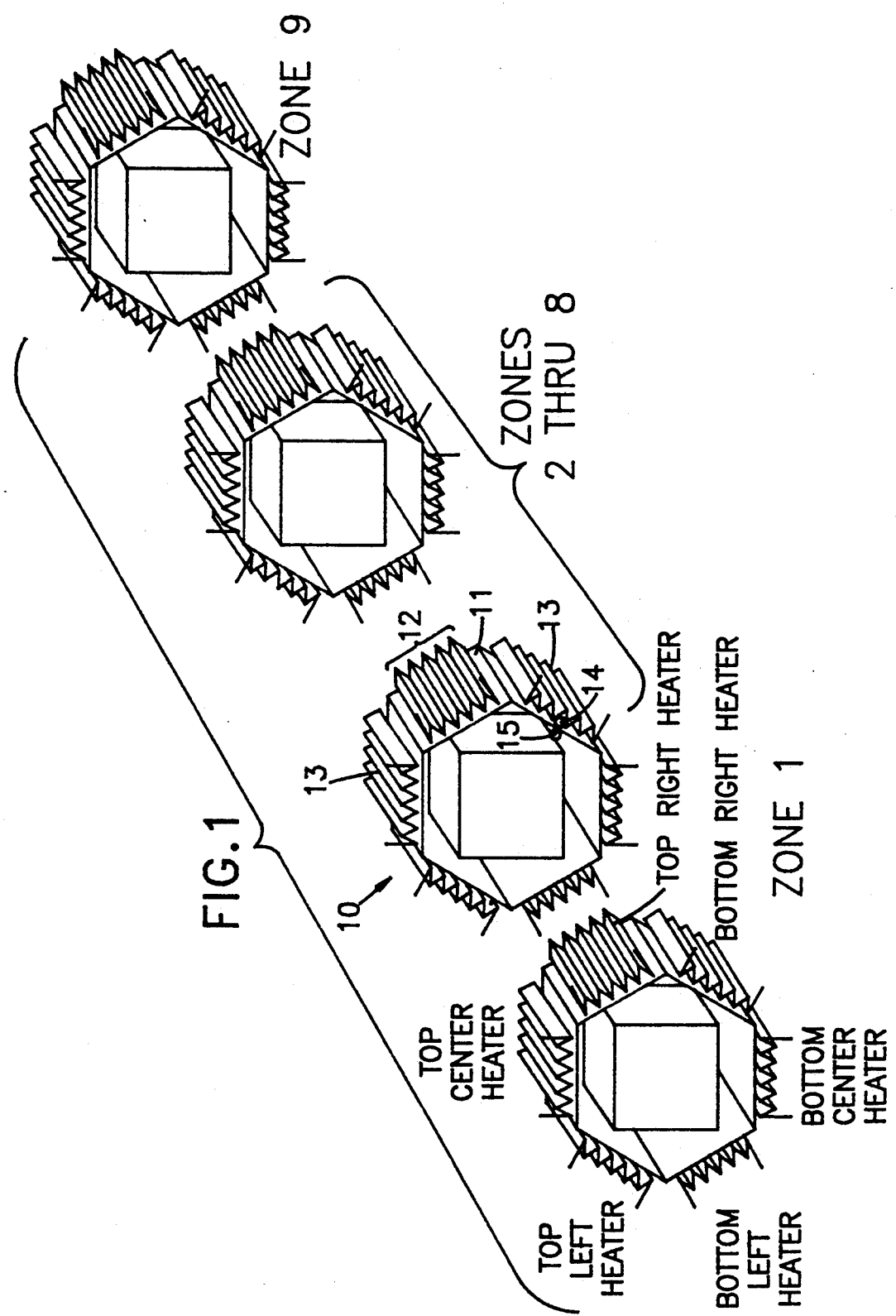

| RANGE | TL | TC | TR | BL | BC | BR | PH | DR |
|---|---|---|---|---|---|---|---|---|
| 20-200 | 10 | -12 | 5 | 0 | 3 | 30 | 23 | 35 |
| 200-400 R | 10 | 0 | 14 | 13 | 1 | -3 | 34 | 35 |
| 200-400 H | -12 | 16 | 10 | -4 | 12 | -3 | -2 | -1 |
| STM>150 | 34 | 23 | -7 | 12 | 13 | -5 | -3 | 7 |
| 400-750 R | 23 | -8 | 0 | 0 | -3 | 12 | 12 | 45 |
| 400-750 H | -7 | 10 | 13 | 12 | -8 | -9 | 13 | 32 |
| STM>150 | 12 | 1 | 12 | 14 | -1 | -5 | 0 | 6 |
| 750-900 | 11 | 13 | 5 | 3 | 11 | 13 | 1 | 20 |
| 900-999 | 1 | 2 | 7 | 1 | 0 | 4 | 12 | 2 |
| 999-400 C | -30 | -10 | 0 | 4 | 12 | 13 | 17 | 12 |
| 400-20 C | 0 | 1 | 2 | 0 | 12 | -9 | 12 | -6 |
NOTE 1  R=RAMP RANGE
NOTE 2  H=HOLD RANGE
NOTE 3  STM>150=IN A RANGE WHICH USES STEAM>150 L/M
NOTE 4  C=COOLING PHASE
FIG.2
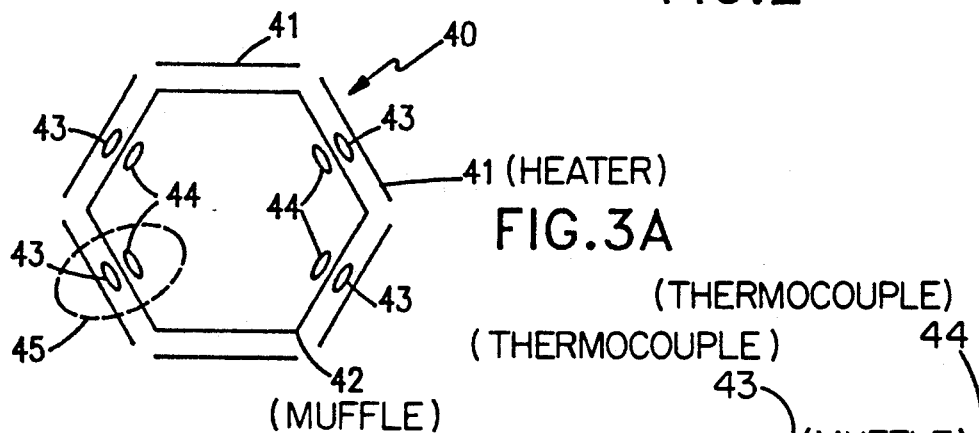
FIG.3A
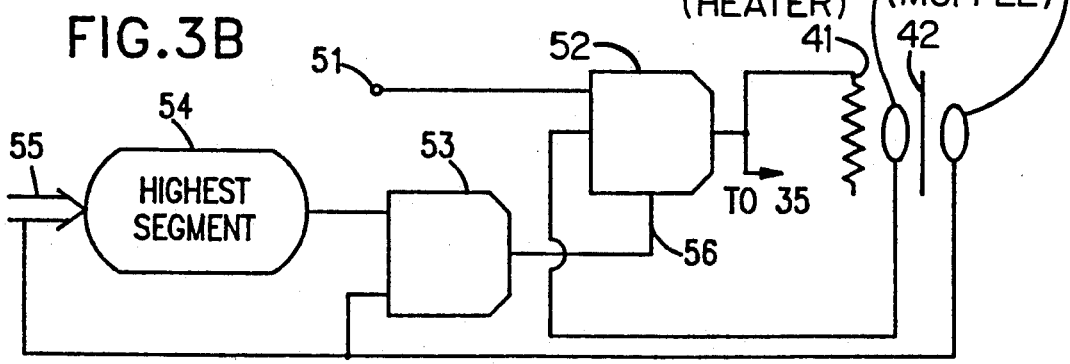
FIG.3B

HEATER AUTOTONE CONTROL APPARATUS AND METHOD

BACKGROUND OF THE INVENTION

1. Field of the Invention

The present invention generally relates to automatic controls for heating equipment and, more particularly, to automatic tuning of multi-zone furnaces.

2. Description of the Prior Art

The manufacturing processes for many types of devices and materials include heat treatment processes. These processes may include raising the device or material to a predetermined temperature for a predetermined period of time or treatment of the device or material at a sequence of different temperatures for respective different periods of time.

It is also often desirable in such manufacturing processes, to provide for continuous processing of such devices or materials, particularly where a sequence of different temperatures are to be used. Furnaces for continuous production often take the form of an elongated chamber which is divided into a plurality of zones which may be maintained at different temperatures. Such a furnace, used for cooking, is shown in U.S. Pat. No. 4,554,437, to Wagner et al. The furnace may include a muffle, generally of circular or elliptical cross-section, to assist in regulating difference in temperature from zone to zone and confine the atmosphere in the vicinity of the heated material as taught in U.S. Pat. No. 4,416,623, to Takahashi. In such arrangements, it is common to place temperature sensors at the muffle in proximity to each heating segment to regulate the muffle temperature and to avoid deformation thereof. The devices or material are then transported therethrough on a conveyor-like arrangement at a speed which assures the desired amount of heat treatment at each temperature. This is referred to as a continuous furnace. Also, in such arrangements, certain zones can be maintained at intermediate temperatures in order to "ramp up" or "ramp down" from one temperature to another.

Ovens of similar multi-zone construction may also be used for batch processing where the oven is initially charged with material and the heat treatment carried out without moving the material. In such a case, the conveyor arrangement may be omitted and all zones maintained at the same temperature, although temperature could be selectively changed as a function of time during the heat treatment process. In this case, the avoidance of temperature gradients is even more critical than in the case of the continuous furnace which will at least perform heat treatment equally on all material passed therethrough.

It can be readily appreciated that such multi-zone furnaces are potentially far more efficient than a furnace where the device or material remained stationary and the temperature of the furnace varied. The consistency of the heat treatment is inherently more uniform and the thermal mass of the furnace itself does not slow heating or cooling when temperature is to be altered, allowing throughput of the furnace to be maximized. Further, since the temperature of each zone ideally remains substantially constant, no energy is wasted in altering the temperature of the thermal mass of the furnace itself.

Multi-zone furnaces, however, are inherently large due to the number of zones which may be provided. The volume of each zone must be comparable to the volume of a single furnace which would be suitable for the device or material to receive heat treatment and may be advantageously made larger to provide for a more smooth temperature transition between zones. Typically, the atmosphere within the furnace will be able to circulate between zones and within each zone and substantial undesirable temperature gradients may occur between or within zones, due to convection and other heat transfer mechanisms. It is therefore known to provide for automatic control of furnaces intended for use where such temperature gradients may be critical, such as in the processing of semiconductor wafers or the manufacture of electronic components such as multi-layer ceramic (MLC) modules. Such an arrangement is shown in U.S. Pat. No. 4,886,954, to Yu et al., which shows a plurality of sensors, digital signal mixing and temperature computation and the use of a so-called PID algorithm (Proportional-plus-Integral-plus-Derivative) to develop signals for control of each heater element of the furnace. Generally speaking, a PID algorithm uses a measured value and an operating set point to derive control for a variable in such a way as to simultaneously maximize the response time for correction and the stability of the automatically controlled system. The details of operation of such an algorithm are not necessary to an understanding of the invention However, additional information concerning PID algorithms and use of the same may be found in *Control System Principles and Design*, by Ernest O. Doebelin, pp. 422–436, John Wiley & Sons, publisher and *Control Systems - Analysis, Design and Simulation*, by John W. Brewer, pp. 199–202, Prentice-Hall, Inc., Publisher, both of which are hereby incorporated by reference.

Most furnaces will have heating elements or "segments" placed around the periphery of the muffle in which heat treatment is to be performed and each segment will be controlled either individually or together with one or more of the other segments. U.S. Pat. No. 4,886,954, cited above, is exemplary of such arrangements. To provide inputs to the control arrangement including a PID algorithm, sensors are typically placed near the muffle and in proximity to the heater segment to be controlled. These segments will be subjected to thermal and mechanical stresses during use as they are turned on and off or otherwise controlled to maintain a nearly constant temperature. The segments will be subjected to further mechanical stresses in the form of vibration due to the means for transporting devices or materials through the furnace. Therefore, occasional failure of a segment is to be anticipated.

However, the failure of even a single segment will require shutting down the furnace in order to replace the segment, resulting in loss of productivity. The likelihood of interruption of operation for such repairs is increased by the number of segments which are present and increases with the number of zones in the multi-zone furnace. Moreover, the economic loss may not be limited to the "down time" of the furnace where, for instance, in a large run of electronic components which must be processed under highly uniform conditions to minimizes chip-to-chip variations, failure of a single heater segment could cause catastrophic loss of an entire run of the components.

Also, in the prior art, it should be noted that one or more sensors may be provided with a PID algorithm (hereinafter simply PID) for each heater segment. The sensors, which are typically thermocouples, are usually located in some proximity to the heater segment since they cannot be placed in the same location as the material or device to be treated. Therefore, each combination of heater segment, sensor group and PID typically operates autonomously from other combinations of heater, sensors and PID. Consequently, it can be understood, as theorized by the inventors, that the more closely the temperature of the furnace is controlled, the greater the number of control cycles will be, which may contribute to degradation of the heater segments and early failure thereof.

For example, as taught by Yu, U.S. Pat. No. 4,886,954, it is also known to provide separate temperature control systems for heater segments at the top and bottom of the furnace in order to reduce the top-to-bottom temperature gradient in the furnace. As disclosed therein, when the top and bottom are commonly heated, the temperature gradient is more pronounced at lower temperatures where heat transfer by convection will be of greater significance in comparison to radiation. This would also occur if the top and bottom sections (each comprising one or more heater segments) were independently controlled relative to a common set point. To minimize the temperature gradient, the system of Yu, U.S. Pat. No. 4,886,954, uses the sensed temperature at the bottom of the furnace both to control the bottom segments and as a set point for the top segments. While this technique was evidently effective to reduce top-to-bottom temperature gradients, such slaving of the top heater segments to the bottom will also tend to maximize the difference between duty cycles of the top and bottom heaters. For example, if the bottom sensor senses a temperature below the set point, the bottom heater segments will be turned on, producing convection and increasing the temperature sensed by the temperature sensors at the top of the furnace. At the same time, the PID for the top heater segments will be controlled to a lower set point and be held off in conformance with the goal of reducing the top-to-bottom temperature gradient. It can be seen that during periods of increasing the furnace temperature, with which Yu, U.S. Pat. No. 4,866,954, is concerned, the heating will be principally done by the bottom heater segments. Therefore, while this arrangement may be successful in reducing temperature gradients, it also tends to maximize the differences in conditions which lead to decay (e.g. thermal aging) and failure of the heater segments.

SUMMARY OF THE INVENTION

It is therefore an object of the present invention to provide an arrangement for automatic control of the temperature of zones of a multi-zone furnace.

It is another object of the invention to provide an arrangement for automatic control of a furnace which equalizes, within a predetermined maximum limit, the contributions of the heater segments to the heating of the furnace to avoid premature heater segment decay and failure.

It is a further object of the invention to provide an arrangement for automatic control of a furnace which minimizes undesired temperature gradients between zones and within each zone of a multi-zone furnace.

It is yet another object of the invention to provide an arrangement for automatic control of a furnace which achieves minimization of undesirable temperature gradients within the furnace while minimizing differential decay and potential for failure between heater segments.

It is another further object of the invention to provide an arrangement for automatic control of a furnace which eliminates the need for manual tuning of the segments of a furnace and dynamically compensates for decay and/or failure of heater segments.

To achieve the foregoing and other objects of the invention, a method is provided including the step of applying power to at least one segment as a function of power applied to at least two other segments.

In accordance with another aspect of the invention, a method is provided including the steps of sensing a temperature of a heater segment, sensing a furnace temperature at a location corresponding to the heater segment, developing a bias signal in accordance with the sensed furnace temperature at the location corresponding to the heater segment, and developing a control signal for the heater segment in accordance with the temperature of the heater segment, a set point signal and the bias signal.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is an exploded schematic view of a multi-zone furnace in accordance with the invention, FIG. 2 is a table of tuning biases which is exemplary of biases which might be obtained by manual tuning for one zone of the multi-zone furnace of FIG. 1, FIG. 3A is a schematic illustration of an arrangement of sensors, both internal and external, PIDs and heater segments in accordance with the invention, FIG. 3B is a schematic illustration of a portion of FIG. 3A showing the functional relationship between the sensors, PIDs and heater segments in accordance with the invention.

DETAILED DESCRIPTION OF A PREFERRED EMBODIMENT OF THE INVENTION

Figure 1A:
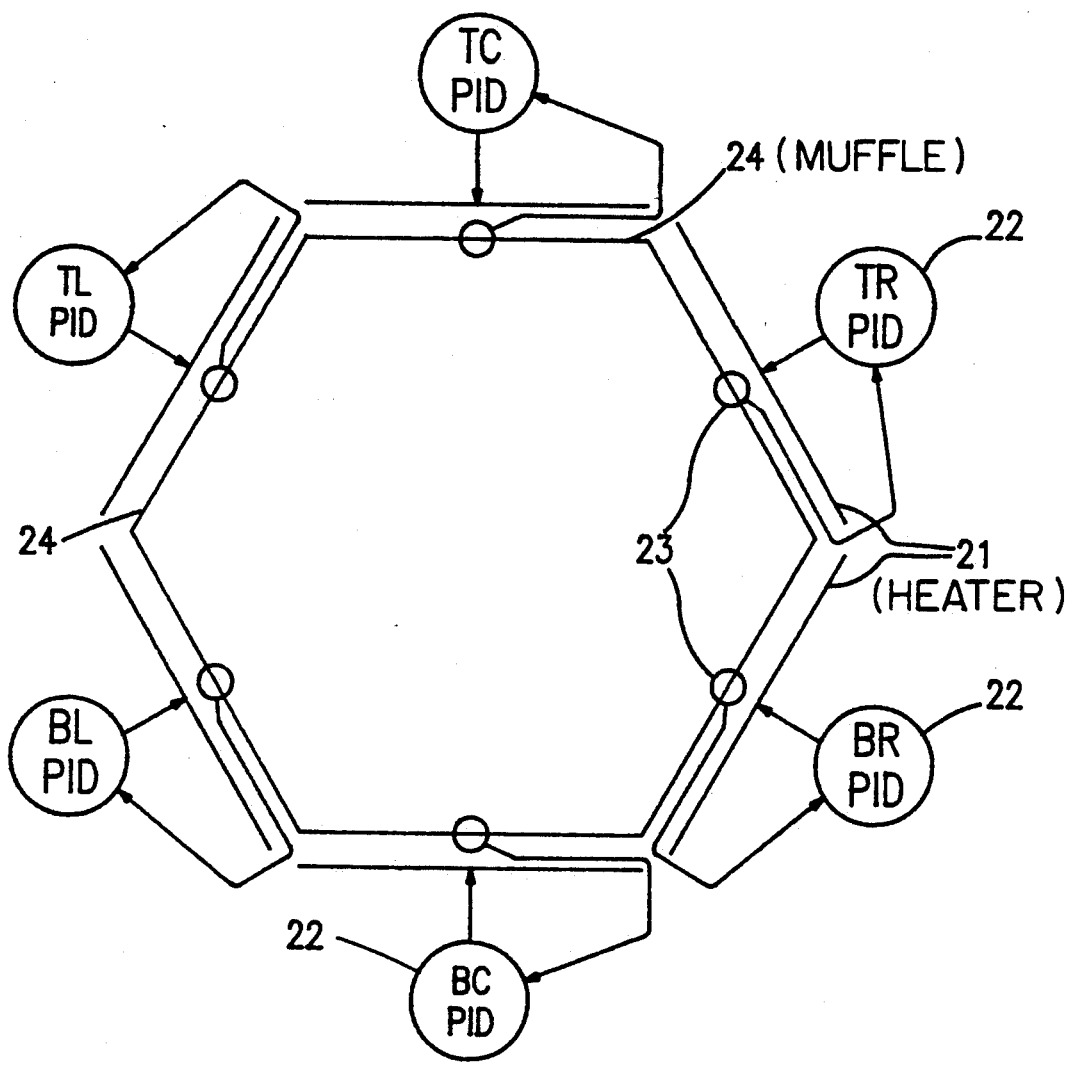
FIG. 1A is a schematic illustration of an arrangement of sensors, PIDs and heater segments as applied to a cross-section of a zone of the furnace of FIG. 1.

Referring now to the drawings, and more particularly to FIG. 1, there is shown an exploded view of a multi-zone furnace 10. The following description will be directed to a nine zone furnace, four of which are illustrated in FIG. 1, but it is to be understood that the invention is directly applicable to any multi-zone furnace regardless of the number of zones which may be provided. Each of the zones is similarly constructed with a substantially identical cross-section. For purposes of illustration, a hexagonal cross-sectional shape is shown but any convenient closed polygon or curve could be used. The cross-sectional shape is preferably defined by a muffle 11, preferably of a metal, for the purpose of confining the atmosphere within the furnace which is also in contact with the material or objects to be subjected to heat treatment. The actual shape of the muffle is generally circular or elliptical but is illustrated as hexagonal for clarity since the shape is not important to an understanding of the invention. The muffle also serves the purpose of diffusion of the radiation from the heater segment to make radiation from the muffle more uniform as well as to restrain and make uniform the convection from the muffle surface. Each section 12 of the periphery of each zone is provided with a heater segment 13 which is controlled by at least one sensor, such as a thermocouple, in the proximity thereof as shown at location 14, between the heater segment and the muffle and preferably located centrally of the segment. Additionally, further sensors are advantageously located within the muffle as shown at location 15. It should be noted that location 15 is preferably located centrally of the segment in a direction about the perimeter of the furnace but between the zones of the furnace since such so-called fixed or internal sensors cannot easily be located within a zone. By way of distinction, sensors located outside the muffle in close association with the segments are referred to as heater or external sensors.

FIG. 1A schematically shows an arrangement of sensors, PIDs and heater segments in which a single sensor, pair of sensors or sensor array is specifically associated with each heater 21 in furnace zone 20. One or more internal sensors and one or more external sensors or both, generally indicated at 23, each provide inputs to a PID 22 which will then provide automatic control of heater 21 relative to a set point for that segment. There may be a common set point for all segments, but, according to one aspect of the invention, the set points may be made different either statically or dynamically (as in Yu, U.S. Pat. No. 4,866,954, cited above) to adjust gradients within a zone or between zones of the furnace.

However, it has been found that improved performance of a multi-zone furnace can be achieved under a variety of furnace operation conditions by not only specifying set points, which can differ from segment-to-segment, but also bias values for the set points. These bias values take the form of a predetermined increment or decrement from the set point for each segment according to each operating condition. For example, as noted above, convection induced temperature gradients will be more evident at low temperatures than at high temperatures where heat transfer by radiation predominates. Consequently, to minimize temperature gradients within a zone, upper segment biases will be a higher increment at low temperatures than at high temperatures. Similar effects will be encountered when the temperature within a zone is changed or a temperature difference is desired between zones. The amount of bias will vary with the temperature difference, rate of change, etc.

Biases can also compensate for differing radiation efficiencies of the segments themselves as well as compensating for aging, decay or degradation of performance of the heater segments. Compensating biases will also change for different specific heats, viscosities and thermal conductivities of particular atmospheres used within the furnace with steam requiring a particularly large compensation by alteration of set point bias.

A table of sample bias values for one zone is shown in FIG. 2. These values are obtained by operating the furnace and manually monitoring the performance of each segment and adjusting the bias, and, hence, the effective set point value of each PID in order to optimize performance of each heater segment and to minimize gradients within zones and between zones under a variety of operating conditions. This manual procedure, known as "tuning", is extremely time consuming as may be appreciated from the fact that a similar table of bias values must be found for each zone of the multi-zone furnace. Also, each bias value will be affected by the bias value of each segment in the same and adjacent zones. This results in over seven hundred interrelated adjustments for a nine-zone furnace and requires approximately four man-weeks to accomplish. Once done, these values are stored in a memory and appropriate sets of values (corresponding to a horizontal line of the table of FIG. 2) are recalled in dependence on the operating mode of the furnace.

The accuracy of tuning of a furnace is also affected by aging of the heater segments and other factors such as deposits on the muffle. Therefore, to maintain acceptable performance of the furnace, tuning must usually be done three or four times over the lifetime of the furnace. Also, since the furnace must be operated under a variety of conditions during tuning, the cost of power for operation of the furnace is substantial, particularly considering that it is a non-productive cost. It should also be noted that tuning is done at the level of the individual heater segments (note that there is a bias value provided for each heater segment, the furnace door heater segment DR and the furnace atmosphere pre-heater PH) and even when portions of a zone are slaved to another portion of the zone, as in Yu U.S. Pat. No. 4,886,954,cited and discussed above, tuning must also be done to achieve optimum performance.

It has been found by the inventors herein that segments at particular locations in respective zones have an increased incidence of failure than segments in other respective locations in the respective zones. It has also been found by the inventors that during steady state furnace conditions, the duty cycle of the different heater segments may vary greatly when each PID is operated at a common set point for control. While tuning can reduce the variation of segment duty cycle slightly by effectively providing differing set points for each segment, the manual tuning process is limited in effectiveness because, once done, it is a static process.

Figure 1B:
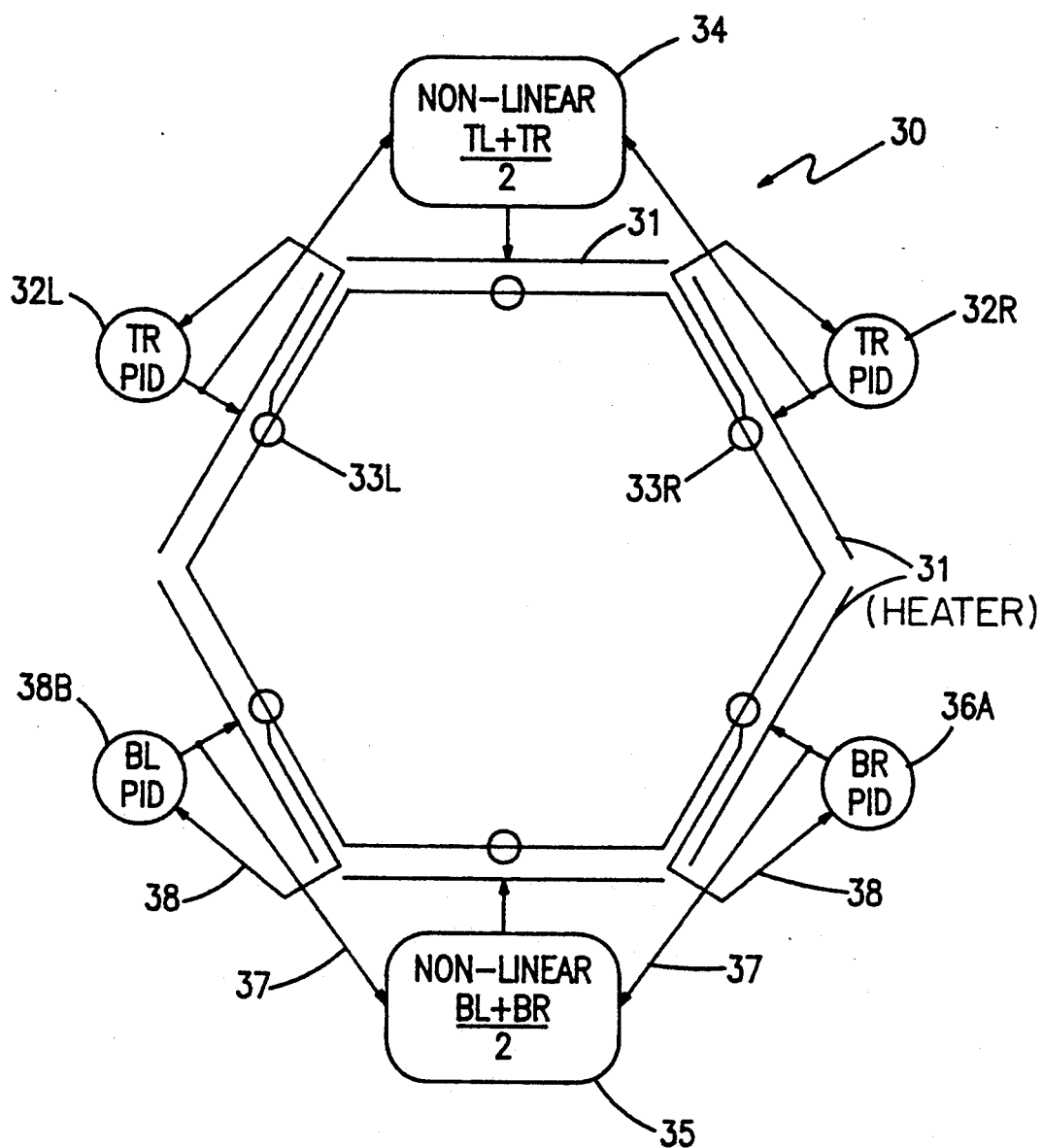
FIG. 1B is a schematic illustration of an arrangement of sensors, PIDs and heater segments in accordance with one aspect of the invention.

Specifically, under any static tuning conditions which result in low temperature gradients within a zone, the bottom center segment will tend to have the highest duty cycle and the top center segment will have the lowest duty cycle. In accordance with one aspect of the present invention, as illustrated in FIG. 1B, the duty cycles of these segments can be equalized by providing an arrangement which will use these segments as supplementary to other segments. Compared to FIG. 1A, this is done in furnace segment 30 by removing the temperature sensors corresponding to the top center and bottom center segments and arranging the top center and bottom center PIDs to operate at average power levels of the top right and left segments and bottom right and left segments, respectively. For example, in FIG. 1B, the respective outputs of temperature sensors 33R and 33L are provided to PIDS 32R and 32L. The outputs of these PIDs are applied to the control of the corresponding heaters 31 in the usual fashion and also to a computation means 34 which may be of either a digital or analog type to control the corresponding heater segment 31 in accordance with the power applied to each of the top left and top right heater segments. It is presently deemed preferable that the top center and bottom center elements be controlled to provide the average power of the top left and right and bottom left and right segments, respectively. However, it may also be advantageous, to provide an additional scaling factor and/or a non-linear function to further equalize aging and decay of the elements to avoid premature failure.

While the above aspect of the invention has been found to be quite effective at equalizing the contributions of each of the segments to the heating of the furnace and effectively avoids premature segment failure, consistent with the maintaining of low temperature gradients within a zone, it only slightly reduces the complexity of the tuning process (e.g. allowing possible omission of two vertical columns of FIG. 2), if at all. Also, as pointed out above, the tuning process can not be fully effective since it is a static process.

To provide an automatic, and, hence, dynamic, tuning arrangement for a multi-zone furnace, a sensor array such as shown in FIG. 3A is provided for each zone 40. A temperature sensor 43 is provided for each heater segment 41 outside the muffle 42 and an additional internal sensor 44 is provided for each segment inside the muffle. As shown in FIG. 3B, which corresponds to the portion of FIG. 3A within dashed line 45, sensors 43 and 44 are connected to separate PIDs for control of segment 41.

According to the invention and as depicted in FIG. 3B, the desired set point control is applied at terminal 51 to PID 52 which controls segment 41 and provides an input to computation means 35 of FIG. 1B. The output of (external) heater sensor 43 is fed back to PID 52 so that automatic control can be achieved. The output of internal sensor 44, inside muffle 42, is fed to PID 53 which produces a bias signal for PID 52. Thus, by using an internal sensor which will sense not only the contribution of the corresponding heater segment but that of other segments in the same vicinity of a particular portion of a zone, the arrangement of FIG. 3B is made capable of dynamically tuning the furnace under any input conditions, thereby fully compensating for aging of the heater segments.

Experience with the arrangement of FIG. 3B, however, revealed one anomaly. When this arrangement was used in a multi-zone furnace, one segment would operate at significantly higher temperature than others, although still within reasonable limits (e.g. approximately 20% difference is believed to be tolerable for most processes). The hottest segment appeared to occur randomly and could often move from segment to segment. Once such a hot spot occurred, it became very difficult to cool that segment and typically would merely result in another hot spot at another location. To avoid this temperature difference between segments, a comparison means 54 is provided to continuously monitor the outputs of all internal (e.g. within the muffle) sensors 44 and to deliver the internal temperature corresponding to the hottest segment to PID 53 as a set point for all other segments. This comparison means 54 is also arranged so that the PID corresponding to the hottest or highest temperature segment will reduce or remove power input to that segment. Thus, all segments other than the highest temperature segment will seek to reach the temperature of the highest temperature segment while the temperature of the highest temperature segment will be reduced. In this way, not only is the aging and decay of segments equalized, but it has been found that response time of the entire furnace is improved without causing the increase of temperature gradients within the furnace.

Figure 3C:
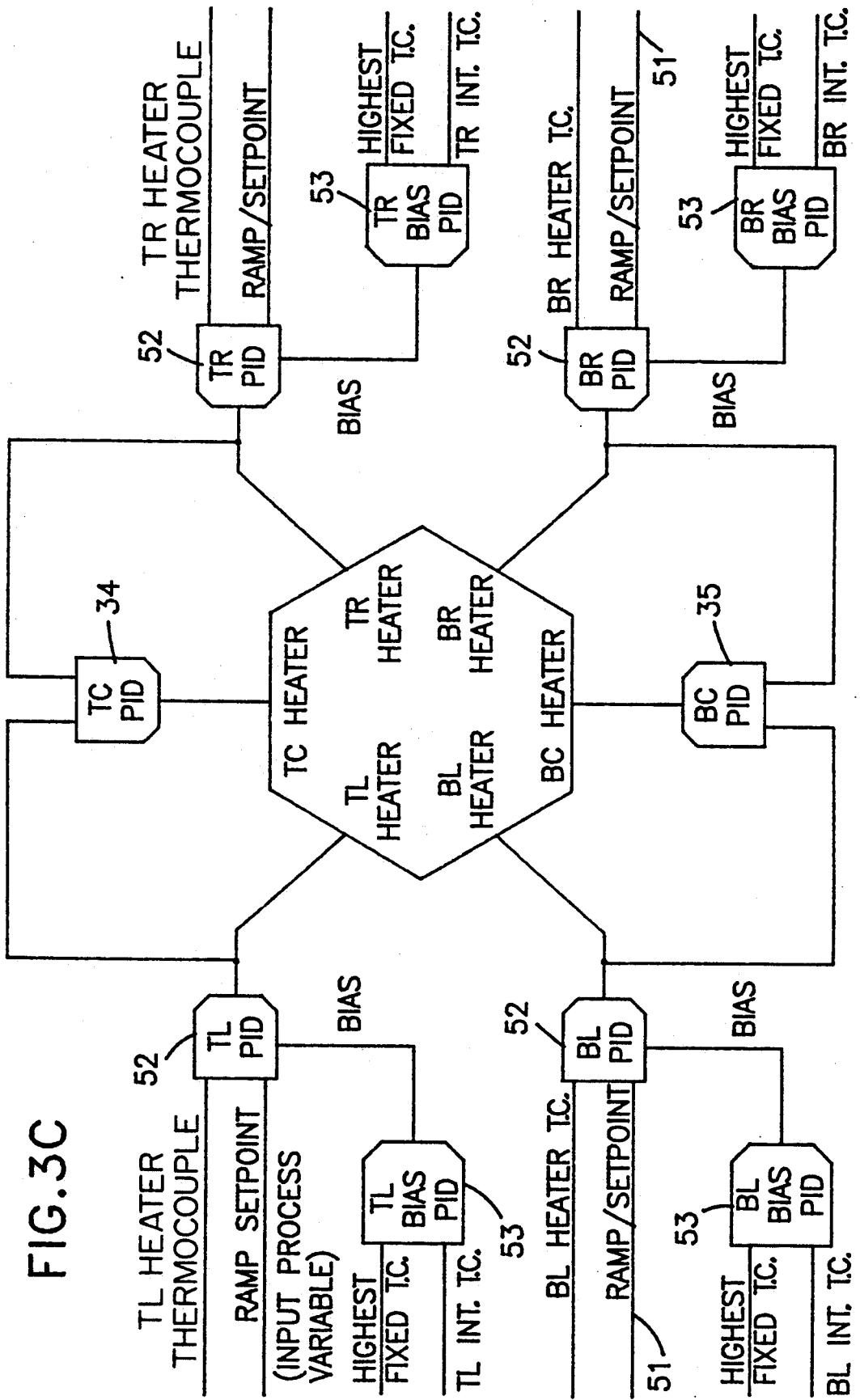
FIG. 3C is a schematic illustration of the relationship of PIDs and heater elements for one zone of the furnace according to the invention.

In summary, the control of segments of a zone of a furnace, in accordance with the invention, is shown in FIG. 3C. This arrangement illustrates how the arrangements of FIGS. 1B and 3B are replicated and connected to portions of the zone and to each other; common reference numerals being used and sensors and connections therefrom being omitted for clarity.

Figure 4:
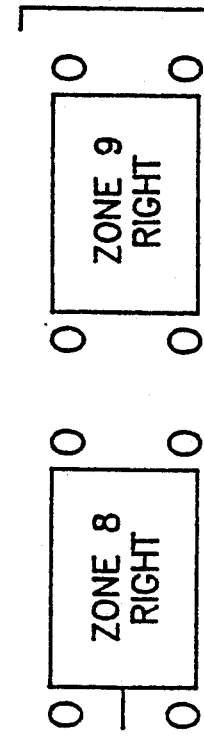
FIG. 4 is a schematic illustration of the averaging of sensor outputs according to a preferred embodiment of the invention.
Figure 4:
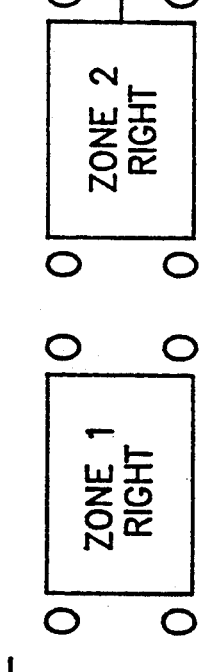
Figure 4:
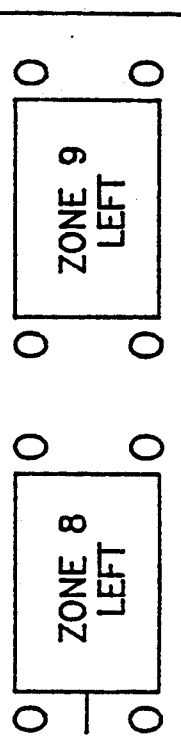
Figure 4:
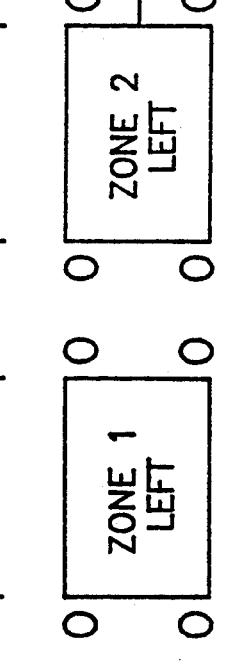
Figure 4:
Figure 5:
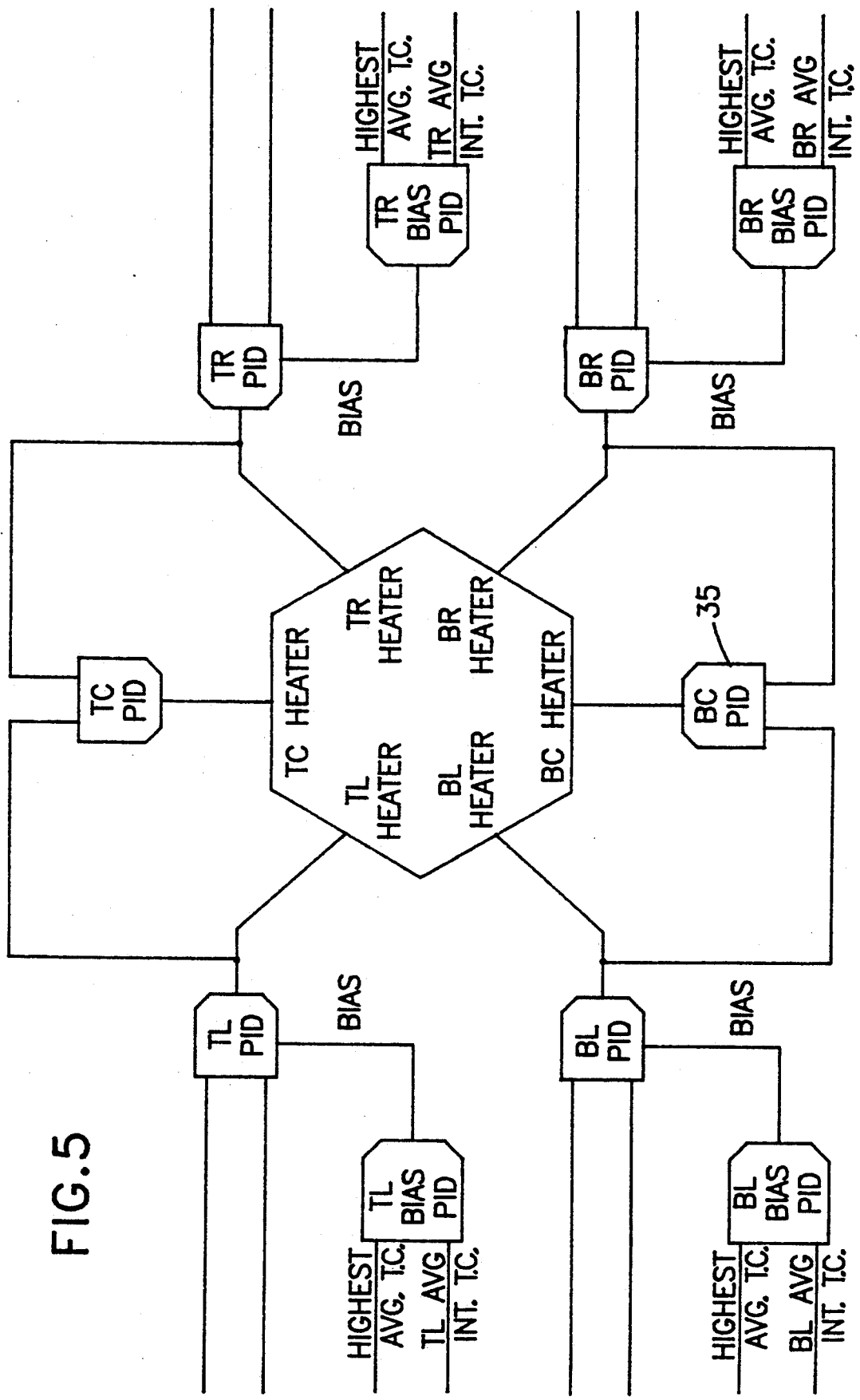
FIG. 5 is a schematic illustration similar to FIG. 3C but corresponding to a preferred embodiment of the invention.

Referring now to FIGS. 4 and 5 and returning briefly to FIG. 1, it will be recalled that internal sensors 15 cannot be practically located centrally of the heater segments. Therefore, in the arrangement summarized in FIG. 3C, the temperatures sensed between zones 1 and 2 were used to control the segments of zone 1, the temperatures sensed between zones 2 and 3 were used to control zone 2, and so forth; the temperatures sensed between zones 8 and 9 controlling both of those zones. Alternatively, one or more additional arrays of sensors could be provided to control zone 9 and/or entry and exit door heaters. However, such an arrangement allows the sensors to be as effectively influenced by the segments of a zone which they do not control as by the segments which are controlled. While this does not cause wide differences in operation of the segments of adjacent zones, due largely to the use of highest temperature comparison means 54, operation of the furnace is not optimized. Therefore, in accordance with a preferred embodiment of the invention, the outputs of respective adjacent arrays are averaged to provide the effect of a virtual sensor within each zone and centrally located with respect to the heater. It should be noted that interpolation may also be used to adjust the effective position of the virtual sensor and to compensate for irregular zone spacing in particular furnace designs.

As shown in FIG. 4, adjacent corresponding internal sensors are combined (e.g. averaged) to develop the effect of four virtual sensors within each zone as depicted with brackets 61, 62, 63, 64. These averaged or interpolated temperature values are applied to PID 53 as shown in FIG. 5, which is otherwise unmodified from FIG. 3C.

Additionally, for control of the door heaters, the end arrays of sensors is preferably averaged to effectively provide a virtual sensor at the center of the furnace cross-section at the entry and exit. Again, interpolation may be used, if desired, to adjust the effective position of the virtual sensor. It has been found sufficient to provide common control of all segments used as door heaters and the arrangement of FIG. 3B would be used to provide control thereof, the averaged temperature value being input to PID 53 as if from sensor 44.

By averaging sensor outputs in this manner to develop virtual sensors, the performance of the furnace is substantially improved. It has been found that this arrangement is sufficiently effective that even failure of a limited number of heater segments can be fully compensated, increasing the effective reliability of the entire furnace and guarding against costly down time and interruption of production runs.

While the invention has been described in terms of a single preferred embodiment, those skilled in the art will recognize that the invention can be practiced with modification within the spirit and scope of the appended claims.

Having thus described my invention, what I claim as new and desired to secure by Letters Patent is as follows:

1. A method of controlling the duty cycle of a heater segment of a furnace including the step of applying power to at least one segment as a function of power applied to at least two other segments.

2. A method as recited in claim 1, wherein said function of power applied to at least two other segments is proportional to an average thereof.

3. A method as recited in claim 1, including the further steps of
   sensing a temperature of a heater segment and at least one other heater segment,
   sensing a furnace temperature at a location corresponding to said heater segment,
   comparing the temperatures of at least two segments,
   developing a bias signal in accordance with said furnace temperature at said location corresponding to said heater segment and a result of said comparing step, and
   developing a control signal for said heater segment in accordance with said temperature of said heater segment, a set point signal and said bias signal.

4. A method as recited in claim 3, including the further steps of
   sensing a furnace temperature at a further location corresponding to but spaced from said location corresponding to said heater segment and
   developing a bias signal in response to a combination of the temperatures of said furnace sensed at said location and said further location.

5. A method of controlling a heater segment including the steps of
   sensing a temperature of a heater segment and at least one other heater segment,
   sensing a furnace temperature at a location corresponding to said heater segment,
   comparing the temperatures of at least two segments,
   developing a bias signal in accordance with said furnace temperature at said location corresponding to said heater segment and a result of said comparing step, and
   developing a control signal for said heater segment in accordance with said temperature of said heater segment, a set point signal and said bias signal.

6. A method as recited in claim 5, including the further steps of
   sensing a furnace temperature at a further location corresponding to but spaced from said location corresponding to said heater segment and
   developing a bias signal in response to a combination of the temperatures of said furnace sensed at said location and said further location.

7. A means for controlling the duty cycle of a heater segment of a furnace including means for applying power to at least one segment as a function of power applied to at least two other segments.

8. A means for controlling a heater segment recited in claim 7, wherein said function of power applied to at least two other segments is proportional to an average thereof.

9. A means for controlling a heater segment as recited in claim 7, further including
   means for sensing a temperature of a heater segment and at least one other heater segment,
   means for sensing a furnace temperature at a location corresponding to said heater segment,
   means for comparing the temperatures of at least two segments,
   means for developing a bias signal in accordance with said furnace temperature at said location corresponding to said heater segment and in response to said means for comparing temperatures of at least two segments, and
   means for developing a control signal for said heater segment in accordance with said temperature of said heater segment, a set point signal and said bias signal.

10. A means for controlling a heater segment as recited in claim 9, further including
    means for sensing a furnace temperature at a further location corresponding to but spaced from said location corresponding to said heater segment and
    means for developing a bias signal in response to a combination of the temperatures of said furnace sensed at said location and said further location.

11. A means for controlling a heater segment including
    means for sensing a temperature of a heater segment and at least one other segment,
    means for sensing a furnace temperature at a location corresponding to said heater segment,
    means for comparing the temperatures of at least two segments,
    means for developing a bias signal in accordance with said furnace temperature at said location corresponding to said heater segment and in response to said means for comparing temperatures of at least two segments, and
    means for developing a control signal for said heater segment in accordance with said temperature of said heater segment, a set point signal and said bias signal.

12. A method as recited in claim 11, further including
    means for sensing a furnace temperature at a further location corresponding to but spaced from said location corresponding to said heater segment and
    means for developing a bias signal in response to a combination of the temperatures of said furnace sensed at said location and said further location.

13. A method as recited in claim 3, wherein said comparing step determines a highest temperature among compared segments.

14. A method as recited in claim 6, wherein said comparing step determines a highest temperature among compared segments.

15. A means for controlling a heater segment as recited in claim 11, wherein said means for comparing further includes
    means for determining a highest temperature among compared segments.

16. A means for controlling a heater segment as recited in claim 14, wherein said means for comparing further includes
    means for determining a highest temperature among compared segments.

* * * * *